(12) United States Patent
Barkley

(10) Patent No.: US 6,324,713 B1
(45) Date of Patent: Dec. 4, 2001

(54) HAND-HELD MOTORIZED UTILITY BRUSH

(76) Inventor: Clarence Dale Barkley, 5024 Useppa Ct., Punta Gorda, FL (US) 33950

( * ) Notice: Subject to any disclaimer, the term of this patent is extended or adjusted under 35 U.S.C. 154(b) by 0 days.

(21) Appl. No.: 09/569,617

(22) Filed: May 12, 2000

(51) Int. Cl.7 .......................... A46B 13/02; A01K 13/00
(52) U.S. Cl. ........................ 15/23; 15/52.1; 119/609
(58) Field of Search .................. 15/23, 52.1, 97.1, 15/98; 119/609

(56) References Cited

U.S. PATENT DOCUMENTS

| | | | |
|---|---|---|---|
| D. 280,468 | 9/1985 | Miller et al. | D4/122 |
| 1,340,040 * | 5/1920 | Gasser | 15/23 |
| 1,394,636 * | 10/1921 | Murray | 15/23 |
| 1,569,167 * | 1/1926 | Anderson, Sr. | 15/23 |
| 1,744,365 * | 1/1930 | Dargavel | 15/23 X |
| 1,770,643 * | 7/1930 | Giambertoni | 15/52.1 |
| 2,275,247 * | 3/1942 | Cavanagh | 15/23 |
| 2,694,826 * | 11/1954 | Blakely | 15/23 X |
| 2,805,529 * | 9/1957 | Mathes | 15/23 X |
| 3,251,085 * | 5/1966 | Jacobs | 15/23 |
| 3,500,490 * | 3/1970 | Teren | 15/97.1 |
| 3,665,546 * | 5/1972 | Horeni | 15/97.1 X |
| 4,168,560 | 9/1979 | Doyel | 15/29 |
| 4,302,122 * | 11/1981 | Moya | 15/23 X |
| 4,476,602 | 10/1984 | Hurn et al. | 15/28 |
| 4,724,563 | 2/1988 | Fry et al. | 15/28 |
| 5,150,273 | 9/1992 | Le Vantine | 361/221 |
| 5,423,102 | 6/1995 | Madison | 15/22.2 |

* cited by examiner

*Primary Examiner*—Mark Spisich

(57) ABSTRACT

A hand-held motorized utility brush for grooming animals and collecting hair from furniture. The hand-held motorized utility brush includes a support member having a handle portion, an angled intermediate portion, and an end portion and a bore extending therethrough; and also includes a motor securely mounted at the end portion of the support member and including a rotatable shaft; and further includes a plurality of bearings mounted about the motor; and also includes a sleeve rotatably mounted about the bearings and having a side wall and a plurality of brush retaining members spaced about and disposed in the side wall; and further includes a brush member being removably and rotatably mounted about the sleeve and being engageable with the rotatable shaft; and also includes a switch and a battery member for energizing the motor.

9 Claims, 2 Drawing Sheets

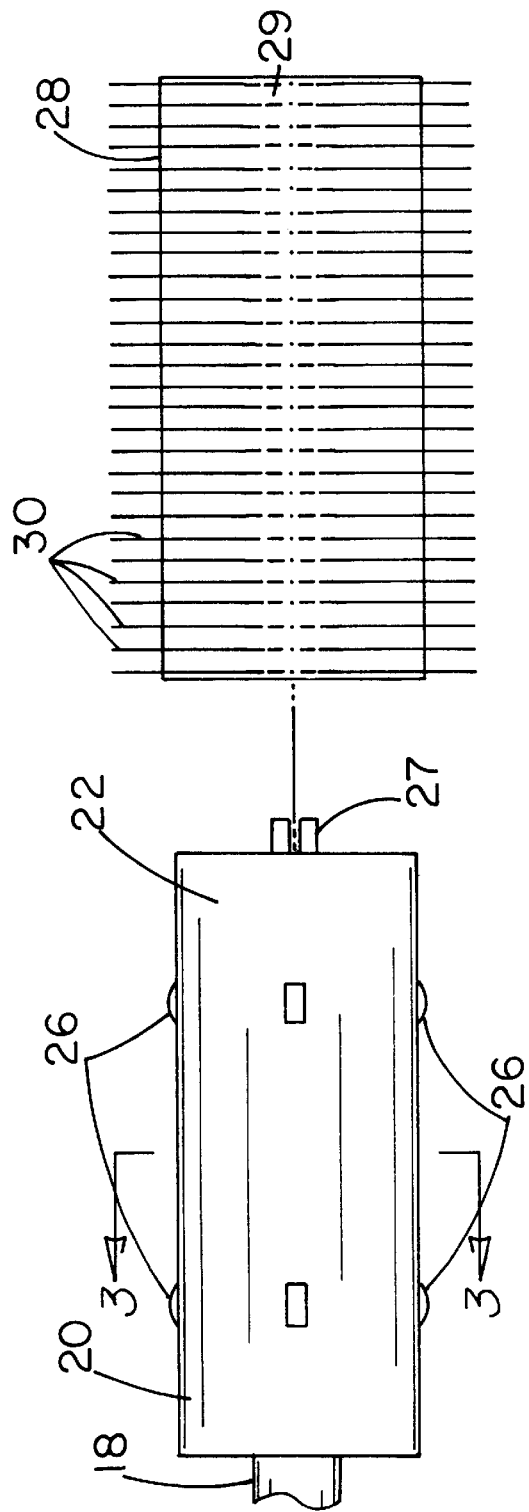
FIG. 2
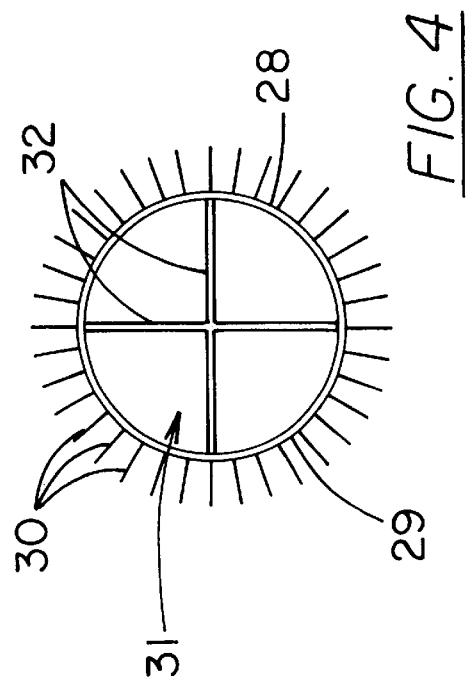
FIG. 4
FIG. 3

HAND-HELD MOTORIZED UTILITY BRUSH

BACKGROUND OF THE INVENTION

1. Field of the Invention

The present invention relates to an electric utility brush and more particularly pertains to a new hand-held motorized utility brush for grooming animals and collecting hair from furniture.

2. Description of the Prior Art

The use of an electric utility brush is known in the prior art. More specifically, an electric utility brush heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,150,273; 4,168,560; 5,423,102; 4.476,602; 4,724,563; and U.S. Pat. No. Des. 280,468.

While these devices fulfill their respective, particular objectives and requirements, the aforementioned patents do not disclose a flew hand-held motorized utility brush. The inventive device includes a support member having a handle portion, an angled intermediate portion and an end portion and a bore extending therethrough; and also includes a motor securely mounted at the end portion of the support member and including a rotatable shaft; and further includes a plurality of bearings mounted about the motor; and also includes a sleeve rotatably mounted about the bearings and having a side wall and a plurality of brush retaining members spaced about and disposed in the side wall; and further includes a brush member being removably and rotatably mounted about the sleeve and being engageable with the rotatable shaft; and also includes a switch and a battery member for energizing the motor.

In these respects, the hand-held motorized utility brush according to the present invention substantially departs from the conventional concepts and designs of the prior art, and in so doing provides an apparatus primarily developed for the purpose of grooming animals and collecting hair from furniture.

SUMMARY OF THE INVENTION

In view of the foregoing disadvantages inherent in the known types of electric utility brush now present in the prior art, the present invention provides a new hand-held motorized utility brush construction wherein the same can be utilized for grooming animals and collecting hair from furniture.

The general purpose of the present invention, which will be described subsequently in greater detail, is to provide a new hand-held motorized utility brush which has many of the advantages of the electric utility brush mentioned heretofore and many novel features that result in a new hand-held motorized utility brush which is not anticipated, rendered obvious, suggested, or even implied by any of the prior art electric utility brush, either alone or in any combination thereof.

To attain this, the present invention generally comprises a support member having a handle portion, an angled intermediate portion, and an end portion and a bore extending therethrough; and also includes a motor securely mounted at the end portion of the support member and including a rotatable shaft; and further includes a plurality of bearings mounted about the motor; and also includes a sleeve rotatably mounted about the bearings and having a side wall and a plurality of brush retaining members spaced about and disposed in the side wall; and further includes a brush member being removably and rotatably mounted about the sleeve and being engageable with the rotatable shaft; and also includes a switch and a battery member for energizing the motor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hand-held motorized utility brush which has many of the advantages of the electric utility brush mentioned heretofore and many novel features that result in a new hand-held motorized utility brush which is not anticipated, rendered obvious, suggested, or even implied by any of the prior art electric utility brush, either alone or in any combination thereof.

It is another object of the present invention to provide a new hand-held motorized utility brush which may be easily and efficiently manufactured and marketed.

It is a further object of the present invention to provide a new hand-held motorized utility brush which is of a durable and reliable construction.

An even further object of the present invention is to provide a new hand-held motorized utility brush which is susceptible of a low cost of manufacture with regard to both materials and labor, and which accordingly is then susceptible of low prices of sale to the consuming public, thereby making such hand-held motorized utility brush economically available to the buying public.

Still yet another object of the present invention is to provide a new hand-held motorized utility brush which provides in the apparatuses and methods of the prior art some of the advantages thereof, while simultaneously overcoming some of the disadvantages normally associated therewith.

Still another object of the present invention is to provide a new hand-held motorized utility brush for grooming animals and collecting hair from furniture.

Yet another object of the present invention is to provide a new hand-held motorized utility brush which includes a support member having a handle portion, an angled intermediate portion, and an end portion and a bore extending therethrough; and also includes a motor securely mounted at the end portion of the support member and including a rotatable shaft; and further includes a plurality of bearings mounted about the motor; and also includes a sleeve rotatably mounted about the bearings and having a side wall and a plurality of brush retaining members spaced about and disposed in the side wall; and further includes a brush member being removably and rotatably mounted about the sleeve and being engageable with the rotatable shaft; and also includes a switch and a battery member for energizing the motor.

Still yet another object of the present invention is to provide a new hand-held motorized utility brush that is easy and convenient to use.

Even still another object of the present invention is to provide a new hand-held motorized utility brush that is not found in the prior art and that can pick up and collect hair from clothes and furniture upholstery which includes that found in vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an exploded partial side elevational view of the sleeve and the brush member of the present invention.

FIG. 3 is a cross sectional view of one of the bearings of the present invention.

FIG. 4 is an end elevational view of the brush member of the present invention.

DESCRIPTION OF THE PREFERRED EMBODIMENT

Figure 1:
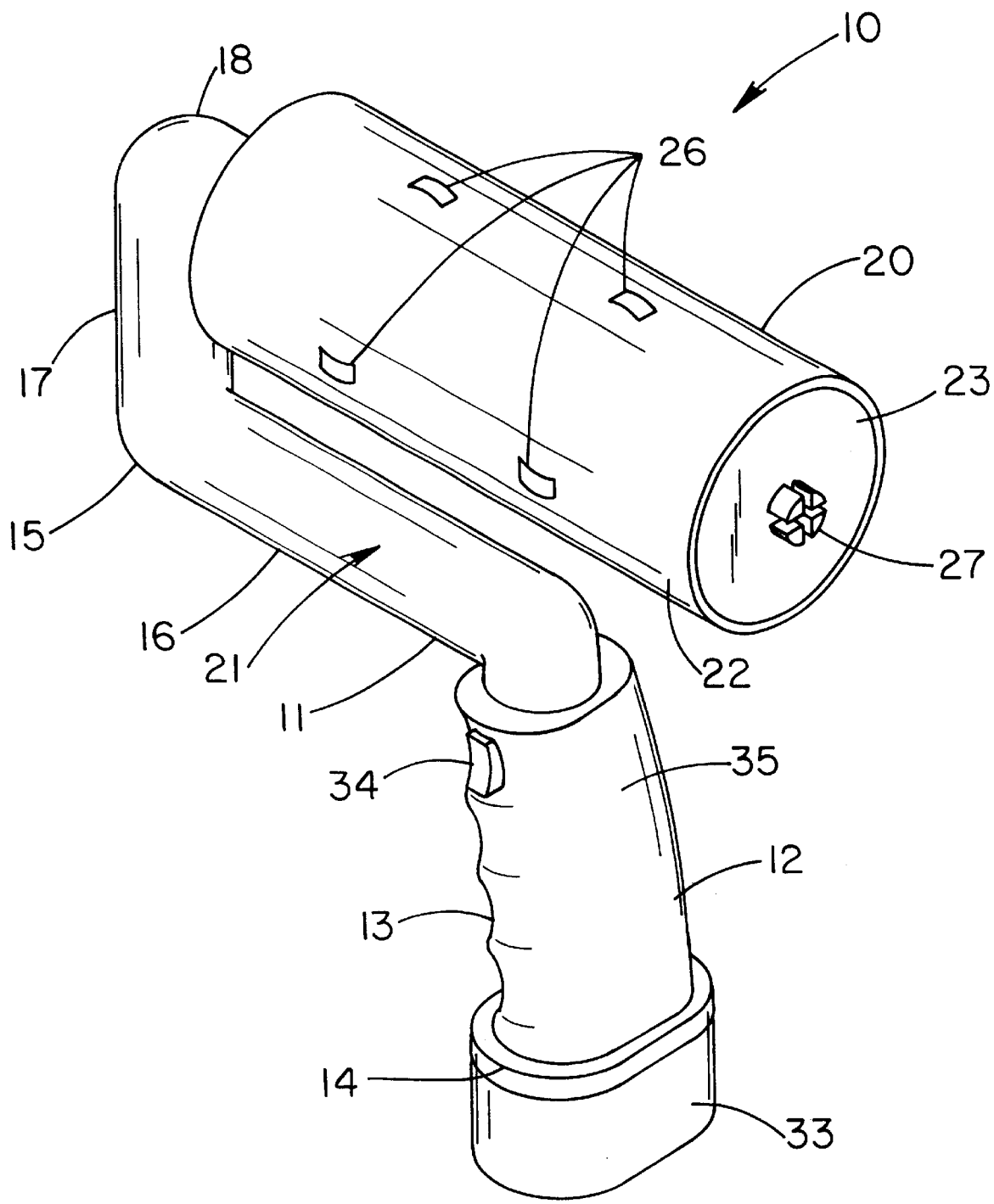
FIG. 1 is a perspective view of a new hand-held motorized utility brush according to the present invention.

With reference now to the drawings, and in particular to FIGS. 1 through 4 thereof, a new hand-held motorized utility brush embodying the principles and concepts of the present invention and generally designated by the reference numeral 10 will be described.

As best illustrated in FIGS. 1 through 4, the hand-held motorized utility brush 10 generally comprises a support member 11 having a handle portion 12, an angled intermediate portion 15, and an end portion 18. The handle portion 12 includes a housing 13 having a bottom end 14 and being essentially a grip for a user to grasp to hold and manipulate the utility brush 10. The intermediate portion 15 includes a first portion 16 which is integrally attached and angled relative to the handle portion 12 and further includes a second portion 17 which is angled relative to the first portion 16.

A motor 23 is securely and conventionally mounted at the end portion of the support member and includes a rotatable shaft 27. A plurality of bearings 25 are securely and spacedly mounted about the motor. A sleeve 20 is rotatably and securely mounted about the bearings and has a side wall 22 and a plurality of brush retaining members 26 spaced about and disposed in the side wall. The brush retaining members are essentially leaf springs and are adapted to engage an interior of a side wall of the brush member 28. A brush member 28 is removably and rotatably mounted about the sleeve 20 and is engageable with the rotatable shaft 27. The brush member includes a plurality of bristle-like members 30 extending outwardly from the side wall thereof with the brush member being essentially a cylindrical member 29 having a bore 31 extending therethrough and further having cross members 32 securely and conventionally disposed at one end thereof and being engageable with the rotatable shaft 27. A means for energizing the motor includes a switch 34 securely, movably, and conventionally disposed in a side wall 35 of the housing 13 and being connected to the motor, and also includes a battery member 33 detachably attached to the bottom end 14 of the housing and being connected to the switch.

In use, the user simply attaches any type of brush member 28 about the sleeve 20 and turns on the switch 34 to actuate the rotation of the shaft of the motor which rotates the brush member 28 which can be used to brush and comb the hair of animals or can be used to brush the upholstery of furniture.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hand-held motorized utility brush comprising:
   a support member having a handle portion, an angled intermediate portion, and an end portion;
   a motor securely mounted at said end portion of said support member and including a rotatable shaft;
   a plurality of bearings mounted about said motor;
   a sleeve rotatably mounted about said bearings and having a side wall and a plurality of brush retaining members spaced about and disposed in said side wall;

a brush member being removably and rotatably mounted about said sleeve and being engageable with said rotatable shaft; and a means for energizing said motor.

2. A hand-held motorized utility brush as described in claim 1, wherein said handle portion includes a housing having a bottom end and being essentially a grip for a user to grasp to hold and manipulate said utility brush.

3. A hand-held motorized utility brush as described in claim 2, wherein said intermediate portion includes a first portion which is integrally attached and angled relative to said handle portion and further includes a second portion which is angled relative to said first portion.

4. A hand-held motorized utility brush as described in claim 3, wherein said end portion is integrally attached and angled relative to said second portion of said intermediate portion.

5. A hand-held motorized utility brush as described in claim 4, wherein said brush retaining members are essentially leaf springs and are adapted to engage an interior of a side wall of said brush member.

6. A hand-held motorized utility brush as described in claim 5, wherein said brush member includes a plurality of bristle-like members extending outwardly from said side wall thereof.

7. A hand-held motorized utility brush as described in claim 6, wherein said brush member is essentially a cylindrical member having a bore extending therethrough and further having cross members securely disposed at one end thereof and being engageable with said rotatable shaft.

8. A hand-held motorized utility brush as described in claim 7, wherein said means for energizing said motor includes a switch securely and movably disposed in a side wall of said housing and being connected to said motor, and also includes a battery member detachably attached to said bottom end of said housing and being connected to said switch.

9. A hand-held motorized utility brush comprising:

a support member having a handle portion, an angled intermediate portion and an end portion, said handle portion including a housing having a bottom end and being essentially a grip for a user to grasp to hold and manipulate said utility brush, said intermediate portion including a first portion which is integrally attached and an-led relative to said handle portion and further including a second portion which is angled relative to said first portion, said end portion being integrally attached and angled relative to said second portion of said intermediate portion;

a motor securely mounted at said end portion of said support member and including a rotatable shaft;

a plurality of bearings mounted about said motor;

a sleeve rotatably mounted about said bearings and having a side wall and a plurality of brush retaining members spaced about and disposed in said side wall, said brush retaining members being essentially leaf springs and being adapted to engage an interior of a side wall of a brush member;

a brush member being, removably and rotatably mounted about said sleeve and being engageable with said rotatable shaft, said brush member including a plurality of bristle-like members extending outwardly from said side wall thereof, said brush member being essentially a cylindrical member having a bore extending therethrough and further having cross members securely disposed at one end thereof and being engageable with said rotatable shaft; and a means for energizing said motor including a switch securely and movably disposed in a side wall of said housing, and being connected to said motor, and also including a battery member detachably attached to said bottom end of said housing and being connected to said switch.

\* \* \* \* \*